United States Patent [19]

Nohmura

[11] 4,204,565
[45] May 27, 1980

[54] BAG SILO

[76] Inventor: Ryotaro Nohmura, 19-19, Nishi 3-chome, Senriyama, Suita-shi, Osaka-fu, Japan

[21] Appl. No.: 3,467

[22] Filed: Jan. 12, 1979

[51] Int. Cl.² .............................................. B65D 81/26
[52] U.S. Cl. ........................................ 150/7; 206/204; 210/172
[58] Field of Search .......................... 150/0.5, 3, 7, 51; 52/3, 63, 192, 194, 197; 210/172; 206/204

[56] References Cited

U.S. PATENT DOCUMENTS

| | | | |
|---|---|---|---|
| 673,821 | 5/1901 | Rahn | 150/7 |
| 1,147,876 | 7/1915 | Logsdon | 150/3 |
| 1,601,625 | 9/1926 | Hruby | 206/204 X |
| 2,804,897 | 9/1957 | Wunderwald | 150/0.5 |
| 3,102,570 | 9/1963 | Fairchilds | 150/3 |
| 3,155,303 | 11/1964 | Fenkel | 229/2.5 R |
| 3,674,073 | 7/1972 | Hendon | 150/7 |

FOREIGN PATENT DOCUMENTS

| | | | |
|---|---|---|---|
| 1080925 | 4/1960 | Fed. Rep. of Germany | 150/51 |
| 49-46751 | 12/1974 | Japan | 150/1 |

Primary Examiner—Donald F. Norton
Attorney, Agent, or Firm—Armstrong, Nikaido, Marmelstein & Kubovcik

[57] ABSTRACT

A bag silo for preparing silage is disclosed. Packings are provided on the inside of the cover flaps for good sealing. Juice emitting from green material can be easily discharged. The bag silo is also adapted to be mounted on the posts driven into the ground.

3 Claims, 8 Drawing Figures

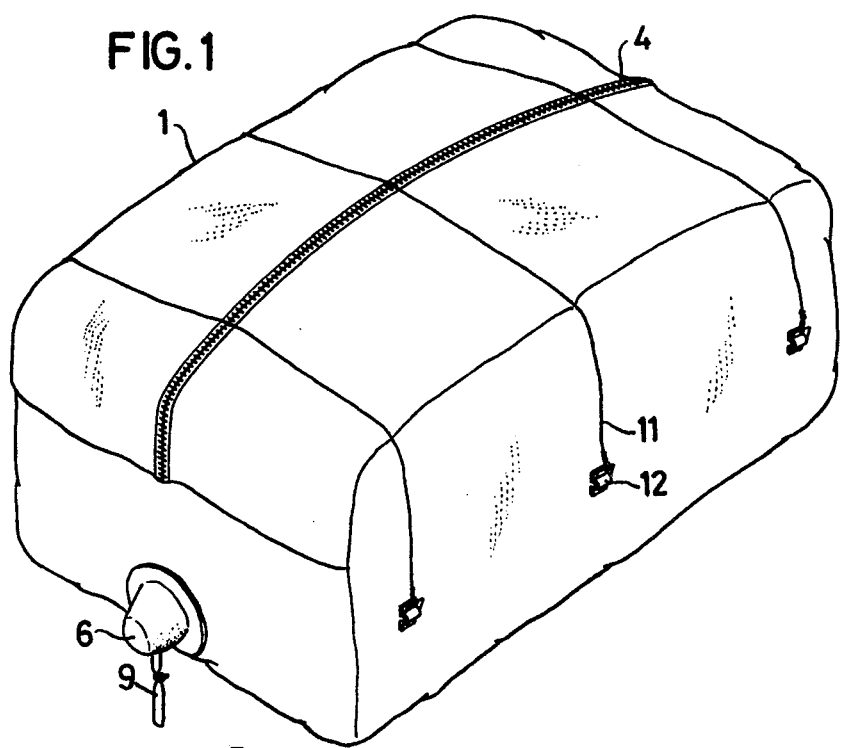
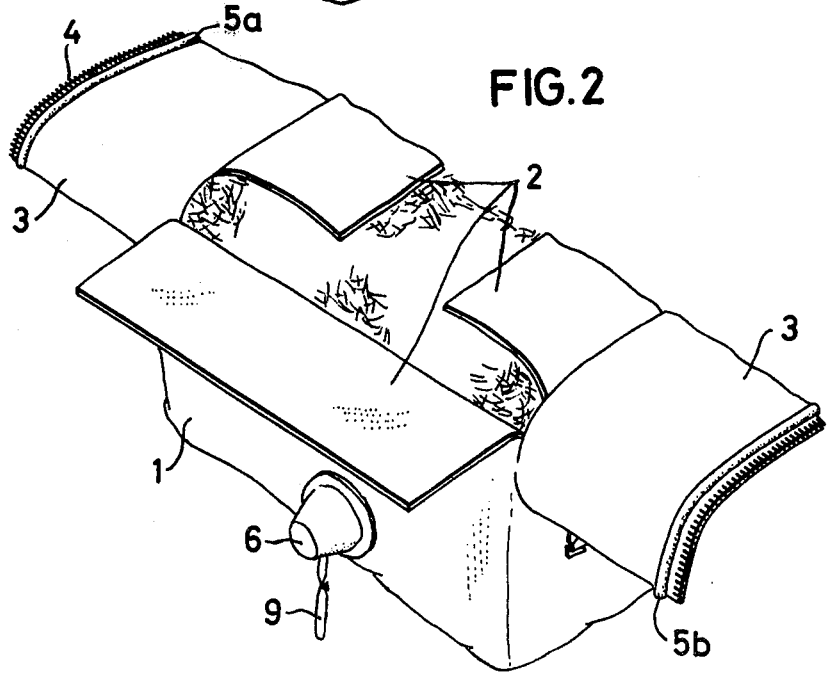

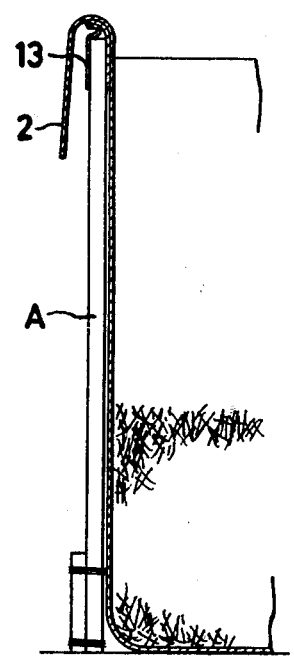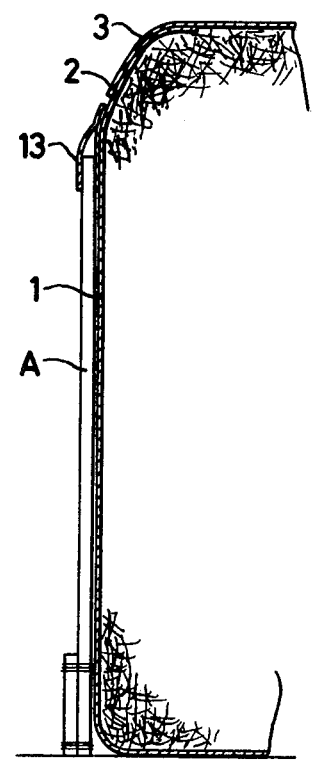

BAG SILO

The present invention relates to an improved bag silo sealed to exclude air after filled with green fodder and used to prepare silage.

The use of bag silos in place of tower silos or bunker silos of large sizes is increasing because of their ease of handling and transportation and freedom in selecting the location. However, conventional bag silos were sealed by closing their top opening and binding it tightly with cords. This was a troublesome work.

To solve this problem, bag silos have been proposed which have a pair of cover flaps each provided with a zipper half to seal themselves. Such silos could not keep the material under anaerobic conditions because of poor sealing. Thus, the quality of silage produced was unsatisfactory.

Another problem of conventional bag silos was that the juice from the material collected at the bottom, impairing the quality. The bag silos with a drain hose connected to their bottom have been proposed. But, such a hose was liable to damage or stoppage by stamping or putting something thereon. Also, air could enter the bag through the hose.

The third problem was that since the bag body was usually made of a soft synthetic resin material, it had to held in a standing open position with man's hands when packing it with materials. It was also difficult to fill it uniformly and closely.

An object of this invention is to provide a bag silo which obviates the above-mentioned drawbacks.

Other objects and advantages of this invention will become apparent from the following description taken with reference to the accompanying drawings;

FIG. 1 is a perspective view of a bag silo embodying the present invention;

FIG. 2 is a perspective view of a portion thereof with the cover flaps opened;

FIG. 7 is a sectional side view of a portion thereof; and

FIG. 8 is a similar sectional side view after the bag silo has been packed.

Figure 3:
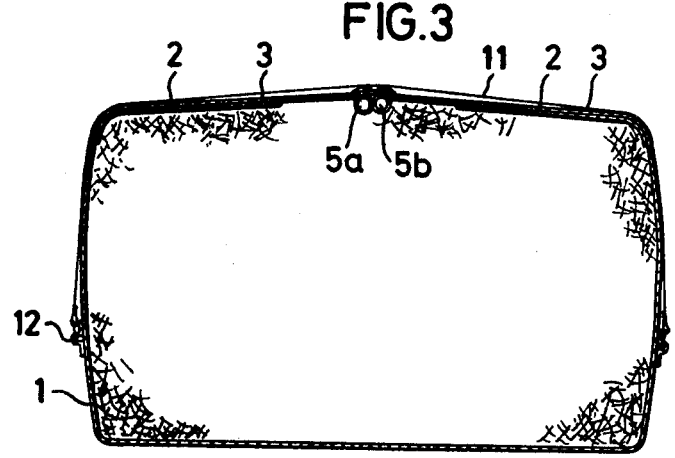
FIG. 3 is a sectional front view thereof.

Referring to FIGS. 1–5, a bag body 1 is provided with an inner flap 2 on each of the top four sides and with a pair of cover flaps 3 so as to overlap one opposed pair of the inner flaps. Either one of the cover flaps 3 or the inner flaps 2 may extend integrally from the bag body 1 with the other fixedly attached to the bag body.

In view of the fact that the bag is used to ferment green material under anaerobic conditions and is let to stand outdoors, it is preferably made of a material having good waterproofness, airtightness, resistance to bite by rats or insects, and weatherability. Resin-treated cloth such as tarpaulin, for example, meets these requirements.

The cover flaps 3 are of a sufficient size to not only cover the top opening of the bag but also partially overlap both ends thereof. The cover flaps 3 each have a zipper half 4 attached to and along their edge so as to engage each other. The cover flaps can be opened by operating the zipper. On the inside of each cover flap is mounted a packing 5a (5b) parallel to and inside the zipper half 4 when the pack is closed. When the cover flaps are closed, these packings 5a and 5b are pressed against each other to hermetically seal the cover flaps. Although in the preferred embodiment tubular packings are used, they may be replaced with other suitable type of packings.

At the bottom of one end of the bag 1 is provided a juice absorber 6 projecting outwardly. It communicates with the bag inside and is filled with a water absorbing material 7 such as sponge. At the bottom it has a drain port 8 to which a drain tube 9 such as a vinyl hose is connected. The drain tube is normally closed by tying fast a cord 10 but is opened by removing it when it is necessary to drain the juice absorbed in the material 7. Of course, two or more absorbers may be provided. The juice absorber should be preferably made in an easy-to-grasp shape.

A plurality of cords 11 are stretched over the closed flaps 3 between cord holders 12 on the sides of the bag to prevent the cover flaps 3 from bulging upwardly. Without them, if the zipper was partially opened to take out a small quantity of silage, they would be swung open by the released pressure of silage.

Figure 4:
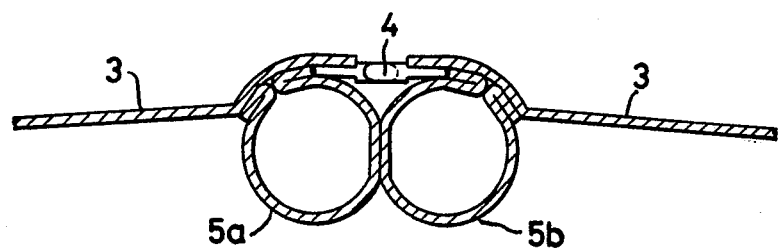
FIG. 4 is an enlarged sectional front view showing how the cover flaps are closed.
Figure 5:
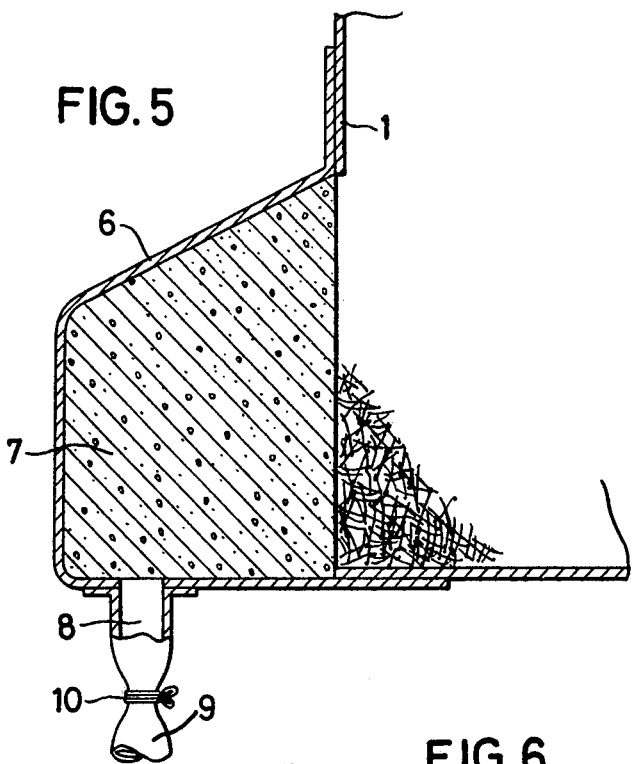
FIG. 5 is an enlarged sectional view of a portion of the bag silo of FIG. 1.

When in use, the bag 1 is first filled with the green material to be ensiled from the top opening. The inner flaps 2 are then put over the material from four sides and the cover flaps 3 are put thereover. The zipper 4 is closed to seal the cover flaps 3 and the bag is tightened with the cords 11. Now the packings 5a, 5b are pressed together, as shown in FIG. 4, to seal the cover flaps airtight, thereby keeping the bag under anaerobic conditions for fermentation.

Since the material filled in the bag has usually a high water content, juice will collect at the bottom of the bag as fermentation proceeds. The juice is absorbed in the water absorbing material in the juice absorber 6. It can be discharged through the drain tube 9 by removing the cord 10 and repeating the squeeze and release of the absorber 6.

Figure 6:
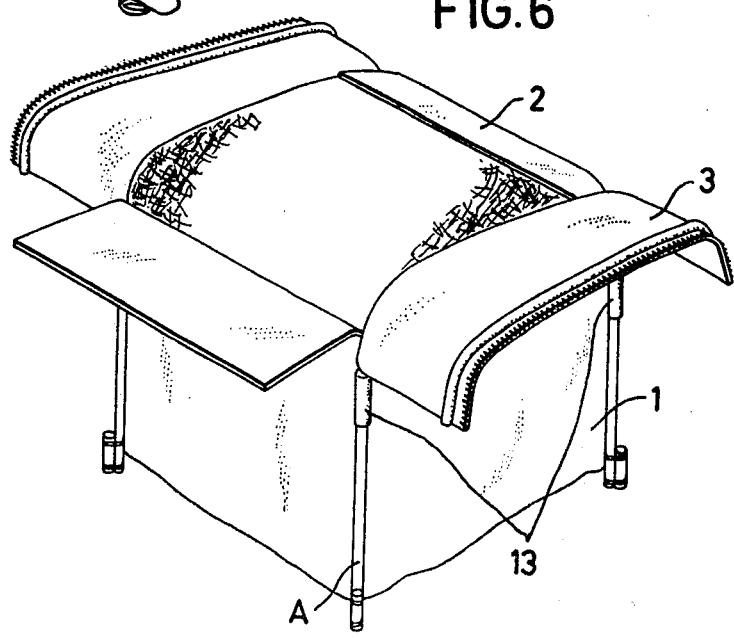
FIG. 6 is a perspective view of the second embodiment with the cover flaps opened.

FIGS. 6 and 7 show another embodiment which includes two inner flaps 2 on the ends of the bag and two cover flaps 3 on the sides thereof. It further includes a cap 13 on each of four corners to receive a post A driven into the ground. Although four caps are provided in this embodiment, the number thereof is not limited to four, but may be suitable for the shape of the bag.

In use, four posts A are first driven into the ground in a rectangular configuration and the bag 1 is put thereon with the four posts in their respective caps 13. Now the bag is kept standing without the necessity of holding it manually. Green material is filled into the bag and the bag is closed and removed from the posts A.

It will be understood from the foregoing that the bag silo according to this invention is easy to open and convenient to discharge the juice. The packings assure secure sealing of the cover flaps. The water absorbing material saturated with juice prevents air from invading the bag. Also, by mounting the bag silo on the posts, it becomes easy to fill it with material and to take the silage out of it. Further, it helps to fill the bag more uniformly.

Although this invention has been described with reference to preferred embodiments, it is to be understood that various changes and variations can be made without departing from the scope of this invention.

What are claimed are:

1. A bag silo for preparing silage from green material, said bag silo comprising:

a bag body, said bag body being comprised of flexible, waterproof material;

an opposed pair of cover flaps extending upwardly from said bag body so as to wholly cover the top opening of the bag when they are closed, said cover flaps being comprised of flexible waterproof material;

fastener means for joining together the edges of said cover flaps, said means forming a weatherproof seal between said edges;

packing means provided on the inside of said cover flaps for making said weatherproof seal substantially airtight;

a juice absorber means disposed at the bottom of said bag and containing a water absorbing material for absorbing the juice from said green material; and a drainage means disposed at the bottom of said bag, said drainage means being in connection with said juice absorber means.

2. A bag silo as claimed in claim 1 wherein at least one opposed pair of inner flaps extend from the ends of the bag, said inner flaps positioned such that when said bag is in a closed position, said inner flaps are enclosed by said cover flaps, said inner flaps being comprised of a flexible waterproof material.

3. A bag silo as claimed in claim 1 further comprising at least two cap means provided on the outer surface of the bag to receive posts or the like.